United States Patent
Le

(10) Patent No.: US 8,860,745 B2
(45) Date of Patent: Oct. 14, 2014

(54) SYSTEM AND METHOD FOR COLOR GAMUT MAPPING

(75) Inventor: Zisheng Le, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1308 days.

(21) Appl. No.: 12/476,116

(22) Filed: Jun. 1, 2009

(65) Prior Publication Data

US 2010/0302439 A1    Dec. 2, 2010

(51) Int. Cl.
G09G 5/02 (2006.01)
H04N 9/67 (2006.01)

(52) U.S. Cl.
CPC ........................................ *H04N 9/67* (2013.01)
USPC .......................................... 345/590; 345/589

(58) Field of Classification Search
USPC ............ 382/238, 162; 345/660, 88, 601, 619; 348/441; 375/240.24
See application file for complete search history.

(56) References Cited

U.S. PATENT DOCUMENTS

| | | | |
|---|---|---|---|
| 5,987,165 A * | 11/1999 | Matsuzaki et al. | 382/162 |
| 2004/0056874 A1* | 3/2004 | MacInnis et al. | 345/660 |
| 2006/0262217 A1* | 11/2006 | Thompson et al. | 348/441 |
| 2007/0046687 A1* | 3/2007 | Soroushi et al. | 345/589 |
| 2009/0016442 A1* | 1/2009 | Shankar et al. | 375/240.24 |
| 2009/0087111 A1* | 4/2009 | Noda et al. | 382/238 |
| 2009/0174638 A1* | 7/2009 | Brown Elliott et al. | 345/88 |
| 2009/0201312 A1* | 8/2009 | Wu et al. | 345/619 |
| 2010/0008427 A1* | 1/2010 | Chiu et al. | 375/240.18 |
| 2010/0046612 A1* | 2/2010 | Sun et al. | 375/240.02 |
| 2010/0128976 A1* | 5/2010 | Stauder et al. | 382/162 |
| 2010/0149203 A1* | 6/2010 | Mebane | 345/589 |
| 2010/0277502 A1* | 11/2010 | Frederick et al. | 345/601 |

* cited by examiner

*Primary Examiner* — Phi Hoang
(74) *Attorney, Agent, or Firm* — Seed IP Law Group PLLC

(57) ABSTRACT

Methods and systems are described for conducting gamut mapping of color video signals from a first color gamut associated with video source to a second color gamut associated with a receiving display device.

23 Claims, 5 Drawing Sheets

SYSTEM AND METHOD FOR COLOR GAMUT MAPPING

TECHNICAL FIELD

The present invention relates generally to gamut mapping necessitated by the display of video content on a variety of different display devices, each characterized by a unique color gamut. The need to adapt the signal to the color gamut provided by the display source is important. The inventions described herein apply to, chips, systems, methods, software, and general hardware for conducting gamut mapping in a video display environment.

BACKGROUND OF THE INVENTION

The present world display devices operate with a distorted (non-linear) input signal to produce an approximately accurate color reproduction when displayed. This is primarily an artifact of the non-linear display distortion effects that characterize most CRT (cathode ray tube) devices. Additionally, there are many distortions and imperfections caused by all of the imaging devices that capture video and image content as well as distortions introduced by source devices that present the content. In an ideal world, the voltage coming from an electronic camera would be directly proportional to the intensity (power) of light in the scene. Also, the light emitted by a CRT would be directly proportional to its input voltage, and so on. However, real-world devices do not behave in this way.

As briefly stated above, video monitors have historically introduced a certain level of color distortion to the received video signal. Additionally, a certain level of distortion introduced by the video capture and processing steps. Thus, in order to display a video signal that accurately reflects the actual images obtained certain corrections are commonly made to the signal input into a display device.

It is well known that CRT displays, almost all photographic film, and many electronic cameras have nonlinear signal-to-light-intensity or intensity-to-signal characteristics. In the industry, most CRT display devices were found to have a level of distortion that is very well approximated using a power function. In one generalized approach, the power function can be described as follows;

$$x = y^\gamma$$

Where x defines the output signal and y defines the input. The power function γ describes the exponential value used to relate the input and output. The exponent is often called "gamma" and denoted by the Greek letter gamma γ. By convention, input and output are both scaled to the range 0 to 1, with 0 representing, for example, black. Analogously, 1 represents maximum (e.g., white (or red, etc)). Normalized in this way, the power function is completely described by the exponent.

So, given a particular device, the output can be measured as a function of its input. In the industry it is common to refer to a device as having "a gamma of x" which commonly means a device having a power-law response with an exponent of x. Although many devices can have different power functions, it is fairly common in the industry for monitors to have a γ of 2.2 (even digital display devices exhibit the behavior as an artifact of a typical γ for industry standard CRT's). Thus, any signal being displayed by a CRT is distorted by the "display γ". One particularly common level of such distortion leads to a gamma of about 2.2. This has had an effect on the industry as a whole. In order to correct for the "gamma" distortion introduced by CRT's a complementary distortion is introduced into the input signal, such that when the input signal is displayed, the two effects cancel each other out to produce a display output having generally linear behavior. Due to the commonly occurring and largely uniform distortion occurring a most of the CRT displays made, the industry found it cost effective to introduce a predetermined distortion at the point of content creation rather than conduct γ correction at each display produced. In this way, all of the expensive processing required to correctly color balance a signal is done initially at a small number of locations and thus saves the cost of expensive processing circuitry at each display device.

This situation is far from ideal. First, there are many CRT's that do not display received signal with a gamma of 2.2. This will cause a fair amount of color distortion in the displayed images. In one non-comprehensive example, some devices display at a γ of 1.4. Some displays are more flexible allowing multiple different γ values. However, as an artifact from an older era, a gamma of 2.2 is typically encoded into all color signals distributed as content. This limitation becomes more pronounced when modern display devices are considered. Many of these devices can have virtually any gamma they like as well as very non-linear gamma's. Thus, the need for the legacy 2.2 gamma function is diminishing.

An added problem with this older scheme is that most of this data is typically encoded using 8-bit resolution. This means that for each color channel in a video signal there are 256 separate graduations of intensity. While this is sufficient for most CRT's and many people, the enhanced ability of newer display technologies and the advent of high definition television and its many high resolution analogs, has generated a desire for color signals of higher fidelity. Additionally, signal encoded in with one color format in mind may not "map" very accurately into another format. While existing systems and methods work well for many applications, there is an increasing demand for inexpensive methods and systems that can conduct gamut mapping between two color gamuts to take full advantage of modern multimedia equipment devices (e.g., displays), software and devices. In particular, there is a need for high resolution mapping between color gamuts of various devices. The disclosure addresses some of those needs.

SUMMARY OF THE INVENTION

In one aspect, an integrated circuit package configured to operate in a display device is described. The package comprises an input for receiving input video signals encoded in a first format characterized by a first color resolution, a mapping system that converts the input video signal into a higher resolution color format and maps the signal from a first color gamut to a second color gamut and then de-resolves the mapped signal to a desired output format having a lower resolution color format to generate an output video signal; and an output system configured to receive the output video signal from the mapping system and outputting an output video signal.

The circuit package including a mapping system that comprises, color resolution enhancement circuitry that converts an input video signal from an initial format having an initial color resolution into a higher resolution video signal defined by an expanded bit range and enhanced color resolution. The circuit package having color mapping circuitry that receives the higher resolution signal and maps it from a first color gamut associated with the input signal to a second color gamut thereby generating a second higher resolution video signal mapped into the second gamut. The mapping system further including color deresolution circuitry that receives the second higher resolution video signal and converts it into an output video signal encoded in a desired display format with an output resolution that is lower than the expanded resolution mapped video signal.

The invention further including a method of color mapping video information. The method includes receiving an input video signal encoded in a first format characterized by a first color resolution and converting the input video signal from the first format into a higher resolution video signal defined by an expanded bit range and enhanced color resolution. The method color maps the higher resolution video signal from a first color gamut associated with the input video signal to a second color gamut associated with a desired output. This operation generates a higher resolution mapped video signal associated with the second gamut. The method then converts the higher resolution mapped video signal into an output video signal encoded in a desired display format having a lower resolution than the higher resolution mapped video signal.

The invention further including a computer program product for gamut mapping from one gamut to another, the program having computer readable instructions comprising: instructions for receiving an input video signal encoded in a first format characterized by a first color resolution; instructions for converting the input video signal into a higher resolution video signal defined by an expanded bit range and enhanced color resolution; instructions for color mapping the higher resolution video signal from a first color gamut associated with the input video signal to a second color gamut associated with a desired output, thereby generating a second higher resolution video signal that defines an expanded resolution mapped video signal in accordance with the second gamut; and instructions for converting the expanded resolution mapped video signal into an output video signal encoded in a desired display format having a lower resolution than the expanded resolution mapped video signal. This approach can include computer readable instructions embedded into a semiconductor chip as embedded firmware.

General aspects of the invention include, but are not limited to methods, systems, apparatus, and computer program products for enabling gamut mapping in devices such as display devices and other image and video presentation apparatus.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF EXAMPLE EMBODIMENTS

The present invention relates generally to multimedia color gamut mapping between video and image devices. Such invention includes the systems, circuit apparatus, software, and devices configured to enable the same. More particularly, methods and systems are described for mapping color channels from one video signal associated with a first color gamut to another color gamut such that the colors can be mapped with a desired level of fidelity.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessary obscuring of the present invention.

Figure 1:
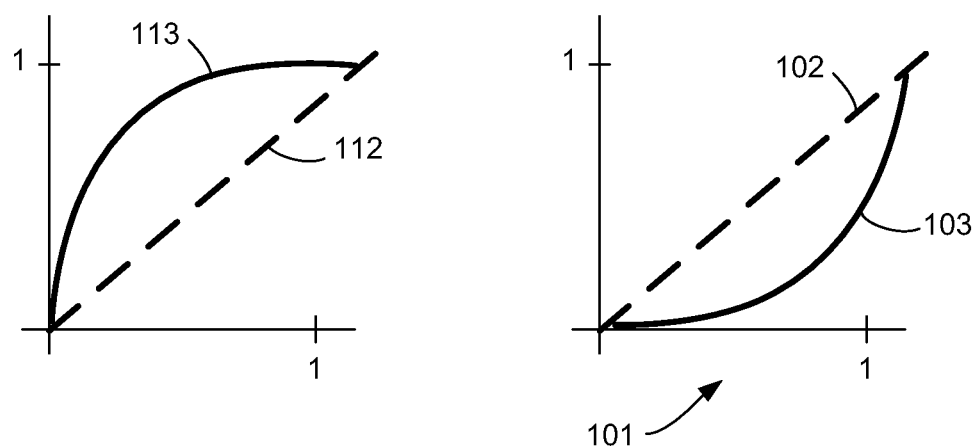
FIG. 1 is a depiction of a gamma of a display device as well as a gamma corrected input signal.

With brief reference to FIG. 1, a graph 101 depicting an example display device color response curve 103 is shown. As is known to those of ordinary skill, in such graphs the color is generally scaled from 0 to 1. A linear response "curve" 102 is shown (in the dashed line) to illustrate an idealized display response curve 102 where the display output (the viewed image) will demonstrate an approximate 1:1 relation (actually more commonly 1.14:1) between the received signal to the actual displayed signal.

As explained above, a 1:1 response curve is not found in standard CRT's. A more realistic approximation is depicted by example curve 103 which closely approximates a color response curve having a "gamma" of 2.2. In common usage a complementary source signal 113 is shown using a gamma corrected color response. Again, the linear response "curve" 112 (dashed line) is contrasted with the source signal 113. In general, the source curve 113 is characterized by a complementary function (gamma corrected) designed to achieve a display image output curve that approximates the linear 1:1 curve 102. Such a "gamma correction" is commonly defined by an inverse power function using a correction factor approximated by $1/\gamma$.

As is known to those of ordinary skill, color can be represented by a number of variables defining a color space. Typical models commonly use three and four dimensional color spaces as well as other color spaces. For example, the so-called RGB color model can be represented by a three-dimensional color space. One such model is the CIE 1976 L*a*b* color space (also referred to as CIELAB) or a CIE 1931 XYZ color space as well as others. In, for example, a CIE 1931 model each pixel in a video signal can be defined by a 3 channel video signal (e.g., one channel for each of the red, green, and blue components). In the past 8-bit color encoding was used to characterize the color signal of a video or image signal. This 8-bit encoded signal defined a "location" for the encoded color in the color space. This served well enough for ordinary CRT displays. However, with the emergence of higher definition video display devices with greater color ranges, this level of fidelity is becoming insufficient to take full advantage of such modern display devices. Typical modern devices include, but are not limited to, LED devices, LCD devices, plasma displays and so on. Such devices demonstrate a wide range of response curves and importantly can define a very wide range of color gamuts.

Briefly, a color gamut is a sub-set of colors that can be accurately reproduced by a device. Importantly, the variation in these gamuts is very wide in modern display devices. The gamuts capable of being displayed can vary widely from one device to another. These variations extend from device type to device type, manufacturer to manufacturer, as well as from model to model. There are many other possible variations as well.

Figure 2:
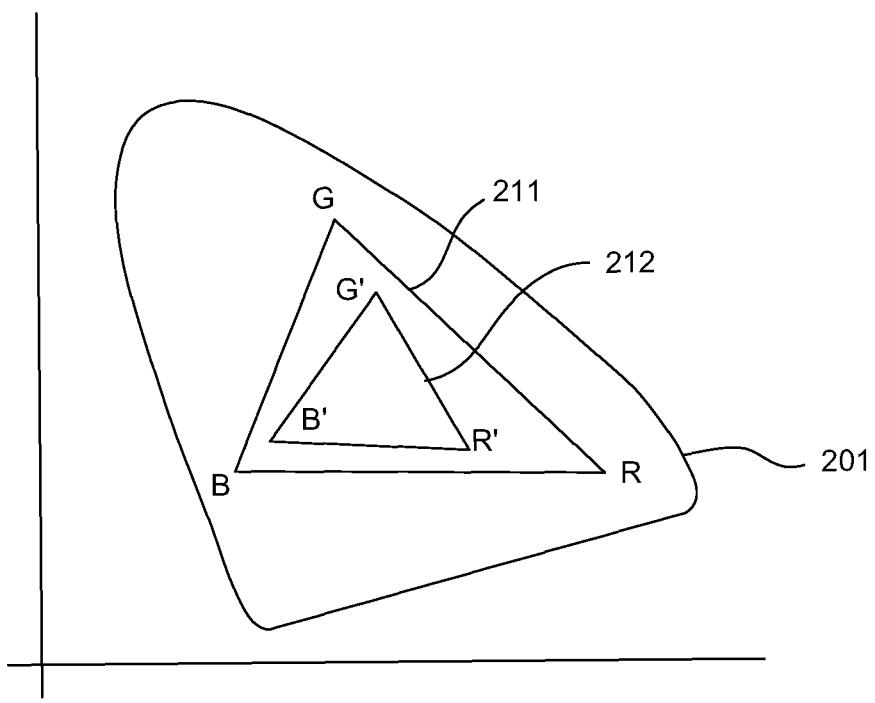
FIG. 2 is a simplified color map that illustrates a visible color space and two different color gamuts associated with different color subsets.

FIG. 2 is a two-dimensional representation 200 of a color space 201 and two representative gamuts 211, 212. In this example, the depicted color space 201 is a device independent color space showing all chromaticities for visible light. Also, a first gamut 211 is shown describing the subset of chromaticities associated with a first format or device. The R, G, and B apexes are shown. For example, such a gamut could be associated with an Adobe RGB gamut. Also, a second gamut 212 is shown describing another subset of chromaticities associated with a second format or device. For example, such a gamut could be associated with an sRGB gamut. In this depiction different R', G', and B' apexes are shown. These are only examples of an inexhaustible number of different gamuts to which the present inventions apply. Additionally, color gamuts represented by substantially varying formats can be used. Examples include RGBI and HSV color spaces and gamuts. The inventor points out that the invention is not limited to these specific color gamuts, which are provided merely as illustrations of a broader concept and are not intended to be in anyway limiting to the disclosed inventions.

In such a multi-gamut environment, there are challenges in mapping color displayed on one device from one gamut (associated with a first device format) to another gamut (of another device). This is made more complicated by the fact that frequently, mapping from a first device having 8-bit resolution to a second device having 8-bit resolution, is not a straightforward proposition and is complicated by the variations in color gamuts between the two devices. One example difficulty encountered in the art is the need to map from one 8-bit color channel displayable using a gamut of a first device to another 8-bit color channel displayable using a different gamut of associated with a second device. This becomes particularly problematic when the 8-bit originating color signal of the first format does not have an exact match in an 8-bit gamut of the second device. Thus, there is a need for obtaining a high fidelity conversion from one color gamut to another color gamut in order to attain the best possible color matching between the two gamuts.

As hinted at above, the inventor has devised an approach for overcoming these color fidelity issues. Among the problems addressed using the inventive technology are the ability to faithfully display the input video using varying display gamuts (and correcting for input video limitations) and to maintain substantially similar color appearance over a wide range of differing display devices, each with their own color gamuts.

In order to accommodate various of the gamut mismatches and gamut differences between varying formats or between devices, the inventor has determined that a more precise description of color is necessary. This is determined using the following example relation: $[2^8]^{2.2}=2^{17.6}$ which describes the range of resolution needed to encompass an 8-bit encoded color signal using a gamma of 2.2. Thus, in a system encoded with a gamma corrected related to a value (2.2) 18-bit resolution is required to accurately map an 8-bit color channel. Thus, to convert from a first gamut to a second gamut requires 18 bit logic and processing to achieve. Such processing and its associated devices are far more expensive than 8-bit logic and processing which was all that was required previously. Thus, a system upgraded to the 18-bit processing required to achieve gamut mapping can be very expensive. The inventor has discovered a method of processing information to reduce the processing burdens of gamut mapping in a way that can reduce the cost systems that use it.

Additionally, the inventor points out that the resolution enhancement required can vary from the 8-bit to 18-bit conversion, which is an advantageous real world application of the technology. For example, using the 2.2 gamma the resolution enhancement for a 10-bit input signal can require a resolution encoding of about 22 bits. Additionally, mapping from systems encoded for gamma 1.4 devices may not require as much resolution to conduct such mapping (e.g., mapping an 8-bit encoded signal may only require 12 bit resolution). The inventors contemplate embodiments applying a variety of different levels of resolution enhancement and gamut mapping.

Figure 3:
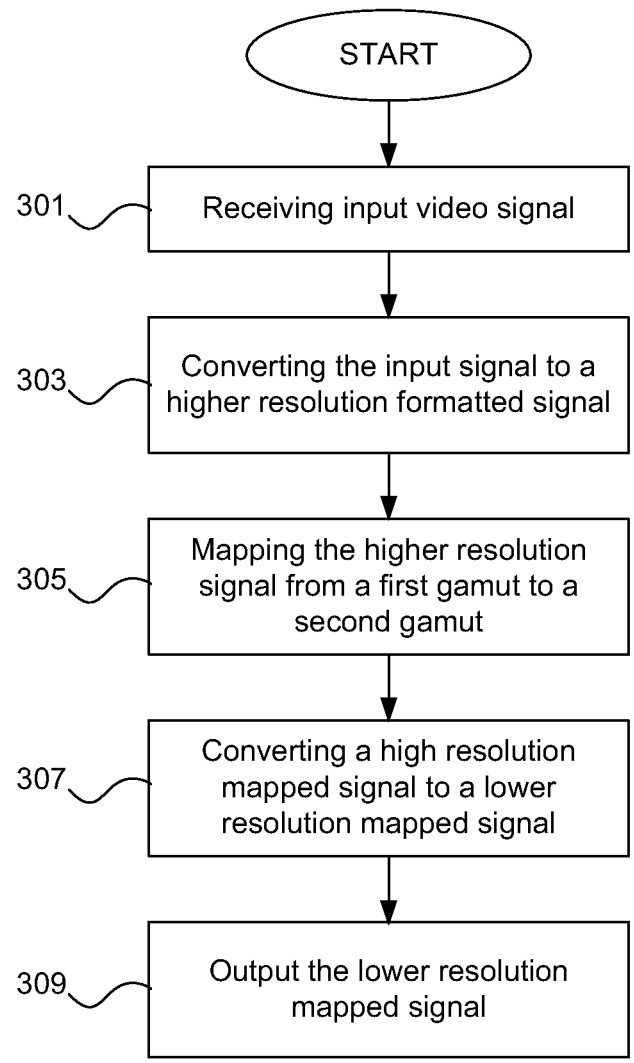
FIG. 3 is a flow diagram illustrating one embodiment of a gamut mapping process in accordance with the principles of the invention.

FIG. 3 describes one example method embodiment of the invention. The process begins with processing circuitry of the invention receiving an input signal (Step 301). This signal can be received at the circuitry by any number of means. In one example, the signal is received at an input port that is connected with a receiver that receives the signal. Typically, such a signal is an image or more commonly a video signal. The input signal is configured in accordance with a first color gamut. Additionally, the input signal can have many different resolutions, but in one common embodiment the signal has 8-bit color encoding. Such signals are typically multiple channel color signals (but can be grayscale signals). For example, the input signal can be a three channel color signal with each of the three channels associated with red, green, and blue respectively. The inventor point out that the invention is not confined to ordinary 8-bit input encoding, with other resolutions, formats, and color channels of course being possible. The input signal is encoded in accordance with a first gamut defining a color space associated with the input signal. This representation of color may not translate well when represented by a device using a different color gamut. Accordingly, to more correctly render the color representation, a color mapping can be used. This mapping begins with a conversion of the low resolution signal to a higher resolution signal to more accurately capture the gamma as described above.

Accordingly, the input signal is converted to a signal having higher color resolution than the original input signal (Step 303). Such conversion or resolution expansion generates a higher resolution video (image) signal having an expanded bit range and an enhanced color resolution. In one example, an input video signal having eight bit color encoding can be expanded to a higher resolution video signal having eighteen bit color encoding. One method for achieving such a conversion can be accomplished using a look up table (LUT) that correlates each input bit value of the input signal with a specific output value. For example, in one LUT, each of the 256 color values of each channel can be associated with a specific 18 bit color value to generate an 18 bit encoded color signal for each channel.

The following Table 1 illustrates on possible LUT capable of mapping between 256 input color values to an expanded resolution 18 bit encoded color signal. The inventors specifically point out that such a mapping is one embodiment that illustrates a general principle that can be applied to many different mapping schemes.

TABLE 1

| Address | LUT Value |
|---|---|
| 0 | 0 |
| 1 | 1 |
| 2 | 5 |
| 3 | 11 |
| 4 | 21 |
| 5 | 35 |
| 6 | 52 |
| 7 | 72 |
| 8 | 97 |
| 9 | 126 |
| 10 | 159 |
| 11 | 196 |
| 12 | 237 |
| 13 | 283 |
| 14 | 333 |
| 15 | 388 |
| 16 | 447 |
| 17 | 510 |
| 18 | 579 |
| 19 | 652 |
| 20 | 730 |
| 21 | 812 |
| 22 | 900 |
| 23 | 993 |
| 24 | 1090 |
| 25 | 1192 |
| 26 | 1300 |
| 27 | 1412 |
| 28 | 1530 |
| 29 | 1653 |
| 30 | 1781 |
| 31 | 1914 |
| 32 | 2052 |
| 33 | 2196 |
| 34 | 2345 |
| 35 | 2500 |
| 36 | 2659 |
| 37 | 2825 |
| 38 | 2995 |
| 39 | 3172 |
| 40 | 3353 |
| 41 | 3540 |
| 42 | 3733 |
| 43 | 3932 |
| 44 | 4136 |
| 45 | 4345 |
| 46 | 4560 |
| 47 | 4781 |
| 48 | 5008 |
| 49 | 5240 |
| 50 | 5479 |
| 51 | 5723 |
| 52 | 5972 |
| 53 | 6228 |
| 54 | 6489 |
| 55 | 6757 |
| 56 | 7030 |
| 57 | 7309 |
| 58 | 7594 |
| 59 | 7885 |
| 60 | 8182 |
| 61 | 8485 |
| 62 | 8794 |
| 63 | 9109 |
| 64 | 9430 |
| 65 | 9758 |
| 66 | 10091 |
| 67 | 10430 |
| 68 | 10776 |
| 69 | 11128 |
| 70 | 11485 |
| 71 | 11850 |
| 72 | 12220 |
| 73 | 12596 |
| 74 | 12979 |
| 75 | 13368 |
| 76 | 13763 |
| 77 | 14165 |

TABLE 1-continued

| Address | LUT Value |
|---|---|
| 78 | 14573 |
| 79 | 14987 |
| 80 | 15407 |
| 81 | 15834 |
| 82 | 16268 |
| 83 | 16707 |
| 84 | 17153 |
| 85 | 17606 |
| 86 | 18065 |
| 87 | 18530 |
| 88 | 19002 |
| 89 | 19480 |
| 90 | 19965 |
| 91 | 20456 |
| 92 | 20954 |
| 93 | 21458 |
| 94 | 21969 |
| 95 | 22487 |
| 96 | 23011 |
| 97 | 23541 |
| 98 | 24079 |
| 99 | 24622 |
| 100 | 25173 |
| 101 | 25730 |
| 102 | 26294 |
| 103 | 26864 |
| 104 | 27441 |
| 105 | 28025 |
| 106 | 28616 |
| 107 | 29213 |
| 108 | 29817 |
| 109 | 30428 |
| 110 | 31045 |
| 111 | 31670 |
| 112 | 32301 |
| 113 | 32939 |
| 114 | 33583 |
| 115 | 34235 |
| 116 | 34893 |
| 117 | 35558 |
| 118 | 36230 |
| 119 | 36909 |
| 120 | 37595 |
| 121 | 38288 |
| 122 | 38987 |
| 123 | 39694 |
| 124 | 40407 |
| 125 | 41128 |
| 126 | 41855 |
| 127 | 42589 |
| 128 | 43331 |
| 129 | 44079 |
| 130 | 44834 |
| 131 | 45596 |
| 132 | 46366 |
| 133 | 47142 |
| 134 | 47925 |
| 135 | 48716 |
| 136 | 49513 |
| 137 | 50317 |
| 138 | 51129 |
| 139 | 51948 |
| 140 | 52773 |
| 141 | 53606 |
| 142 | 54446 |
| 143 | 55293 |
| 144 | 56148 |
| 145 | 57009 |
| 146 | 57877 |
| 147 | 58753 |
| 148 | 59636 |
| 149 | 60526 |
| 150 | 61423 |
| 151 | 62328 |
| 152 | 63240 |
| 153 | 64159 |
| 154 | 65085 |
| 155 | 66018 |

TABLE 1-continued

| Address | LUT Value |
|---|---|
| 156 | 66959 |
| 157 | 67907 |
| 158 | 68862 |
| 159 | 69824 |
| 160 | 70794 |
| 161 | 71771 |
| 162 | 72756 |
| 163 | 73747 |
| 164 | 74746 |
| 165 | 75753 |
| 166 | 76766 |
| 167 | 77787 |
| 168 | 78816 |
| 169 | 79852 |
| 170 | 80895 |
| 171 | 81945 |
| 172 | 83003 |
| 173 | 84069 |
| 174 | 85142 |
| 175 | 86222 |
| 176 | 87309 |
| 177 | 88405 |
| 178 | 89507 |
| 179 | 90617 |
| 180 | 91735 |
| 181 | 92859 |
| 182 | 93992 |
| 183 | 95132 |
| 184 | 96279 |
| 185 | 97434 |
| 186 | 98597 |
| 187 | 99767 |
| 188 | 100944 |
| 189 | 102129 |
| 190 | 103322 |
| 191 | 104522 |
| 192 | 105729 |
| 193 | 106945 |
| 194 | 108168 |
| 195 | 109398 |
| 196 | 110636 |
| 197 | 111882 |
| 198 | 113135 |
| 199 | 114396 |
| 200 | 115664 |
| 201 | 116940 |
| 202 | 118224 |
| 203 | 119516 |
| 204 | 120815 |
| 205 | 122121 |
| 206 | 123436 |
| 207 | 124758 |
| 208 | 126088 |
| 209 | 127425 |
| 210 | 128770 |
| 211 | 130123 |
| 212 | 131484 |
| 213 | 132852 |
| 214 | 134228 |
| 215 | 135612 |
| 216 | 137003 |
| 217 | 138403 |
| 218 | 139810 |
| 219 | 141225 |
| 220 | 142647 |
| 221 | 144078 |
| 222 | 145516 |
| 223 | 146962 |
| 224 | 148415 |
| 225 | 149877 |
| 226 | 151346 |
| 227 | 152824 |
| 228 | 154309 |
| 229 | 155801 |
| 230 | 157302 |
| 231 | 158811 |
| 232 | 160327 |
| 233 | 161851 |
| 234 | 163384 |
| 235 | 164924 |
| 236 | 166471 |
| 237 | 168027 |
| 238 | 169591 |
| 239 | 171163 |
| 240 | 172742 |
| 241 | 174330 |
| 242 | 175925 |
| 243 | 177528 |
| 244 | 179139 |
| 245 | 180759 |
| 246 | 182386 |
| 247 | 184021 |
| 248 | 185664 |
| 249 | 187315 |
| 250 | 188974 |
| 251 | 190641 |
| 252 | 192316 |
| 253 | 193999 |
| 254 | 195690 |
| 255 | 197388 |

In one common implementation, an 8-bit encoded video signal is defined by three 8-bit encoded color channels for each pixel. For example, the three values can correspond to an RGB color system. For example, the color values for a pixel can be represented by RGB channels $[R_8, G_8, B_8]$ which are each input into a look up table (or alternatively input into a set of color mapping functions) to produce 18-bit encoded output channels represented in an 18-bit RGB color space as $[R_{18}, G_{18}, B_{18}]$.

After converting to 18-bit encoding, the signal can be subject to further processing. Most importantly, the colors of the input signal are mapped from a first color gamut associated with the input signal to a second gamut (Step 305). Additionally, in some applications the processing may include deinterlacing, scaling, anti-aliasing, as well as many other processes. However, in this described embodiment mapping to the second gamut is done without intervening process steps. The second gamut can be any color gamut, but typically the second gamut is associated with an intended display device. The gamut mapping is performed using the higher resolution encoded signal for greatest fidelity and most precise color capture in the second gamut. Typically such gamut mapping is performed using a matrix of mapping functions that define a relation between the colors of the first gamut and the colors of the second gamut. Here the mapping converts each of the incoming channels from their 18-bit representations in the first gamut to 18-bit representations characterized by the second gamut (associated with the display). In one example, the mapping matrix can comprise a 3×3 matrix of nine conversion functions that map the three input color channels (defined using the RGB values of a first color gamut) into three output color channels (having new R'G'B' values defined by a second color gamut) associated with an output display gamut. In another example, the mapping matrix can comprise additional offsets at both matrix input and output. In a specific example, each channel of a three channel RGB signal described by the source gamut, encoded in 18-bit format, is mapped by an appropriate function matrix, into a three channel 18-bit color encoded RGB output signal. One example matrix is described by the 3×3 mapping matrix shown below.

$$\begin{bmatrix} R' \\ G' \\ B' \end{bmatrix} = \begin{bmatrix} r_{rr} & g_{rg} & b_{rb} \\ r_{gr} & g_{gg} & b_{gb} \\ r_{br} & g_{bg} & b_{bb} \end{bmatrix} * \begin{bmatrix} R + R_{offset1} \\ G + G_{offset1} \\ B + B_{offset1} \end{bmatrix} + \begin{bmatrix} R_{offset2} \\ G_{offset2} \\ B_{offset2} \end{bmatrix}$$

Once mapped into a color space associated with the second gamut, the mapped signal can be "de-resolved" from its enhanced resolution format into a desired display format (Step 307). As used here, "de-resolved" means converting the enhanced resolution mapped signal into a lower resolution signal. This de-resolution step can de-resolve the signal to any desired color resolution. Typically, the signal is converted to a resolution that is the preferred display resolution of a receiving display device. In one common embodiment, after mapping, the enhanced resolution mapped signal is converted from an 18-bit color resolution to an output signal having a desired color resolution such as 8-bit encoding. Such conversion generates a lower resolution video (image) signal displayable in a desired format. One method for achieving such a conversion can be accomplished using a second look up table (LUT) that correlates each higher resolution color bit value of the mapped signal with a specific lower resolution output value. For example, in one LUT, each of the 262,144 color values of each 18-bit channel can be associated with a specific 8-bit color value to generate an 8-bit encoded color signal for each channel.

In one alternative approach, to reduce processing cost in step 305 and/or step 307, the resolution-expanded input signal can be dithered down to lower resolution but still much higher than the input resolution, for example from 18-bit to 16-bit resolution to achieve pseudo 18-bit precision with lower cost. In one example, "Floyd-Steinberg dithering" can be used to dither the eighteen bit encoded channels to 16-bit encoded channels, for example, using adjacent pixels (either in time or in space).

In a wider approach, the de-resolution process can be used to reduce the bit resolution to any level desired. For example, the signal can be converted from an example 18-bit encoded signal to a 10-bit (or other) color resolution if desired. Typically, the final resolution format is a reduction in color resolution and is determined by the color resolution supported by the sink (e.g., display) device. Additionally, the color gamuts could be completely different with a 3 channel RGB formatted signal mapped into a second gamut associated with a four channel CMYK format. Many other gamuts and mapping are contemplated by the inventors.

Once the video signal is converted back to the desired format it is output for further processing (Step 309). This output signal transmitted for further processing by any number of means. In one example, the signal is output to an output port. In one approach, the signal is output from the system using a transmitter device. Thus, a translated color (or grayscale) video signal, converted to operate with the second gamut is output from the system.

One advantage of such a system is that most large amounts of video processing can be done before or after the mapping is performed. In this manner, the pre-processing and post-processing is conducted using the lower resolution signal using, for example, 8-bit encoding, which substantially reduces the cost of the required circuitry. Thus, the high resolution memory and processing intensive phase of the process is concentrated in the gamut mapping process. Thus expensive circuitry is confined to the gamut mapping process rather than the entire system. Thus, one of the inventive embodiments enables the ancillary video processing and correction processes to be decoupled from the gamut mapping processes to achieve efficient and low cost video processing suitable for high fidelity and high definition applications.

Figure 4:
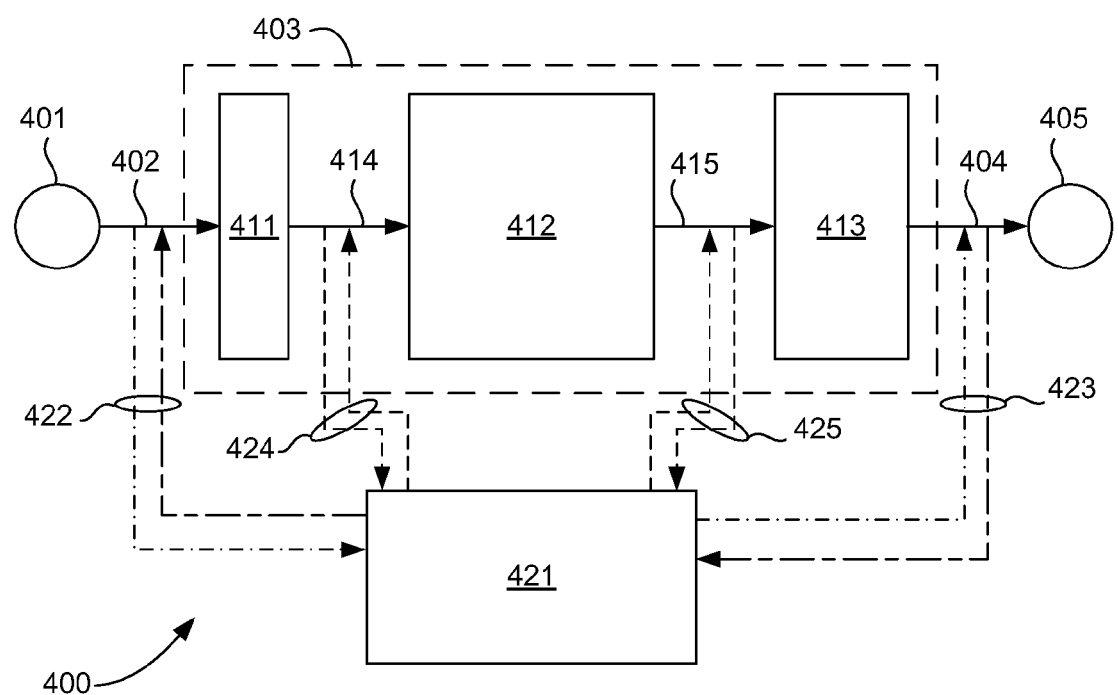
FIG. 4 is an extremely simplified block depiction of gamut mapping system and scheme used in accordance with the principles of the invention.

FIG. 4 is a high level schematic diagram depicting one embodiment of an integrated circuit device 400 capable of performing gamut mapping in accordance with the principles of the invention. The depicted embodiment is shown in a system-on-a chip (SOC) embodiment capable of integration into a single integrated circuit chip. However, the inventor expressly points out that various aspects of the depicted system can be incorporated onto many different chips and or circuit boards or devices if desired. An input 401 is included to receive video signal. This can be as simple as a common electrical connection and can include many other components. It can include an input port, a common receiver, a wireless receiver, and many other devices. The idea being that any apparatus capable of transmitting image or video signal to the remaining components of the system can be suitable. A video signal received at the input 401 is transmitted as an input signal 402 into a mapping system 403 which maps from one gamut to another and then exports the mapped signal 404. The mapping system 403 maps the signal from one color gamut associated with the input signal into another gamut associated with an output signal and then exports the mapped signal 404. The mapped signal is then received by output 405 which enables the transmission of the signal 404 to other devices. This can be as simple as a common electrical connection and can include many other components. It can include an output port, a common transmitter, a wireless transmitter, and many other output devices. The idea being that any apparatus capable of transmitting image or video signal to the remaining components of the system can be suitable. It should be expressly pointed out that the input 401 and output 405 can comprise components of other devices and apparatus. The input 401 and output 405 merely define possible entry and exit points for signals processed by the system and can comprise components of other systems or devices as well as located remote from the mapping system 403.

With continued reference to FIG. 4, the mapping system 403 further includes a color resolution enhancement module 411, a mapping module 412, and a de-resolution module 413.

The color resolution enhancement module 411 typically includes circuitry configured to convert the input video signal 402 from a first format having the first color resolution into a higher resolution video signal 414 defined by an expanded bit range and enhanced color resolution. In addition to the conversion processing circuitry, the module typically includes an associated buffer and memory circuitry as well as other supporting circuit elements. The inventor specifically, points out that this function can be performed by software or firmware imbedded in the conversion processing circuitry. Thus, one example of a mode of operation includes the aforementioned conversion of the 8-bit encoded color signal to the enhanced resolution 18-bit color encoded signal. In one implementation, this module 411 comprises a look up table that converts the original encoded color signal 402 to an enhanced resolution color encoded signal 414. In one implementation the look up table can be arranged to receive input from an 8-bit encoded color signal which is converted to an associated 18-bit color encoded lookup table output signal. Each color channel of an inputted video signal is converted in this way.

The enhanced resolution color encoded signal 414 is then input into the color mapping module 412 which maps the signal 414 from the first gamut associated with the input signal 402 to a second color gamut associated with a desired format. The second gamut typically, but not exclusively, is associated with a display device that will receive the color mapped signal. Thus, for example, the signal is mapped from an original color gamut (associated with the input signal 402) to a display color gamut. The color mapping module 412 typically includes circuitry configured to map the high resolution video signal 414 from the first gamut to the second color gamut to generate a second higher resolution video signal 415 that defines an expanded resolution mapped video signal in accordance with the second gamut. In addition to the color mapping circuitry, the module typically includes an associated buffer and memory circuitry as well as other supporting circuit elements. The inventor specifically, points out that this function can be performed by software or firmware imbedded in the color mapping circuitry. Thus, the initial signal is mapped from a first color space into an analog in the second color space defined by the second gamut. In one implementation, this mapping can be accomplished using circuitry that implements a matrix of mapping functions to correctly translate the (expanded resolution) input signal 414 from representation in a first gamut to representation in a second gamut which comprises a mapped color higher resolution signal 415.

The inventor further points out that the mapping module can include circuitry configured to operate matrix mapping functions as described above to enable a signal to be mapped from a first gamut to a second gamut as specified by the matrix functions operated by the circuitry.

The mapped signal 415 is then input into the color de-resolution module 413 which typically includes circuitry configured to convert the mapped video signal 415 back to an output signal 404 having a lower color resolution for output 405. In addition to the conversion processing circuitry, this module 413 typically includes an associated buffer and memory circuitry as well as other supporting circuit elements. The inventor specifically, points out that this function can be performed by software or firmware imbedded in the conversion processing circuitry. Thus, in one example mode of operation, an enhanced resolution 18-bit color encoded mapped signal 415 can be converted into an 8-bit encoded mapped color signal 404. The inventor also points out that in some embodiments the conversion can be performed to output a signal having almost any desired output format or resolution. For example, the mapped signal can be converted from an enhanced resolution 18-bit color encoded signal (described by the second gamut) into a lower resolution signal defined by 8-bit, 10-bit, 12-bit encoding or some other resolution depending on the desired output format. Typically, but not exclusively, this format is selected to match the format and gamut of the intended display system.

In one implementation, this module 413 comprises a second look up table that receives the high resolution color signal 415 (e.g. signals having 18-bit color encoding) and converts this signal into a lower resolution color encoded signal 404. In one implementation the look up table can be arranged to receive input from an 18-bit encoded color signal which is converted to an associated 8-bit color encoded lookup table output signal. Each color channel of an inputted video signal is converted in this way.

Thus, the converted and mapped signal 404 can be forwarded to an output 405 for transmission. The signal can be transmitted elsewhere in the system or into other systems.

The inventor points out that a wide array of ancillary processing and functionality can be associated with the systems described herein. In FIG. 4, this is illustrated by the ancillary processing block 421. Such ancillary processing can include a wide array of signal processing operations. Examples include, but are not limited to denoising, size conversion, scaling, contrast enhancement, deinterlacing, deflicking, deblocking, interpolation, resampling, statistical post processing, softening, requantization, luminance alteration, telecine (pull up/pull down conversion, and so on. These ancillary processes can be introduced at a number of stages in the process. For example, in one approach, the ancillary processes can be performed after 424 the signal is converted by block 411 to a higher resolution signal 414. Alternatively, the ancillary processes can be performed after 425 the signal is mapped from a first gamut to a second gamut 412 but prior to conversion back 413 to a lower resolution signal. Such ancillary processes can be performed in any combination of points 424, 425 in the process.

More importantly, in another advantageous mode of operation, the ancillary processes can be performed at a step 422 prior to both the conversion 411 to higher resolution color encoding and the mapping 412 to the new gamut. Alternatively or additionally, the ancillary processes can be performed at a step 423 after the mapping 412 and after the conversion 413 to higher resolution color encoding. The inventor briefly describes some advantages of this approach the following discussion of FIG. 5.

Figure 5:
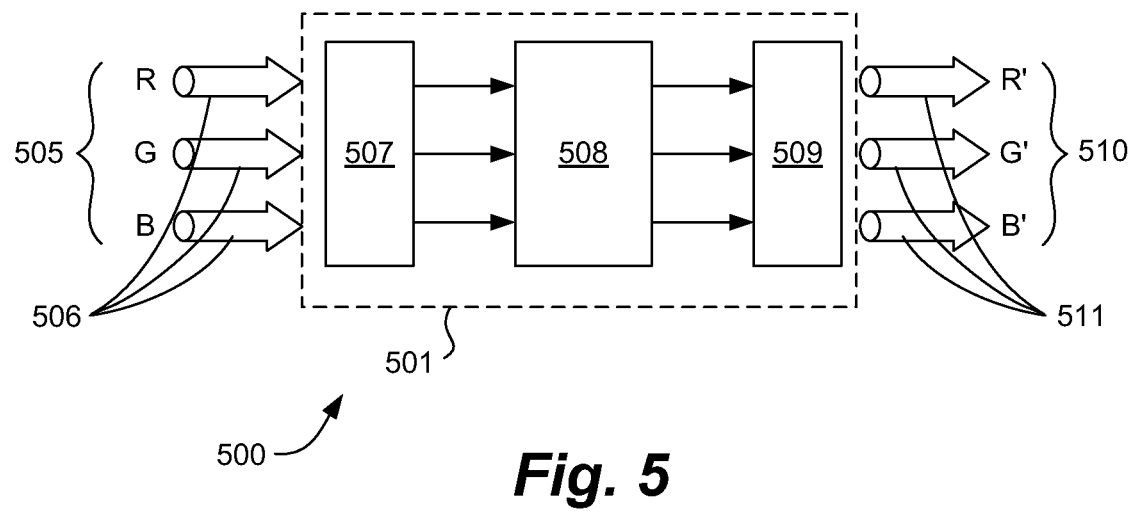
FIG. 5 is another simplified depiction of gamut mapping chip embodiment constructed in accordance with the principles of the invention.

FIG. 5 illustrates a system 500 arranged in accordance with one specific embodiment of the invention. The apparatus 501 depicted is an integrated circuit system on a chip configured to accomplish mapping video content from one color gamut to another color gamut. In one embodiment, the operations of the device are performed by software using a set of computer readable instructions embedded in the circuitry of the chip 501. In the depicted embodiment, the apparatus 501 comprises a device with three directly connected circuitry modules 507, 508, 509. Each of these modules function like adjacent logic blocks with one block feeding directly into the next block without intervening processes. In one embodiment, an input signal 505 comprises a plurality of color channels 506. In one example, the channels can correspond to the red, green, and blue channels of an RGB encoded color signal. Other color encoding and channels can be used in accordance with the principles of the invention. Further, each channel is color encoded with a specified resolution. In one example, each RGB channel is encoded using a commonly employed 8-bit encoding. Other encoding is contemplated by the invention. The input signal 505 is introduced into color resolution enhancement circuitry 507. As explained above, the circuitry 507 converts the lower resolution input 505 into a signal having higher resolution color coding. Here, an 18-bit encoding will capture the full resolution indicated for an 8-bit signal with a gamma of 2.2. This resolution enhanced color signal is quickly generated using a look up table forming part of the color resolution enhancement circuitry 507. This enhanced resolution signal is directly input into adjacent logic block 508 that corresponds to the color mapping module 508. In this example case, the color mapping module 508 comprises circuitry including matrix functions arranged to map each of the input channels 506 from their native input color gamut into a desired color gamut associated with a desired output. As discussed above, this can comprise mapping the three input channels into three output channels associated with the desired output color gamut. Typically, the matrix functions map portions of each input channels into the channels of a signal output from the mapping circuitry. The newly mapped color signal is then input into a de-resolution module 509 that converts the high resolution mapped signal to a lower resolution output color signal 510. For example, an 18-bit encoding signal will be converted to a lower resolution 8-bit signal for display. In this embodiment the output color signal 510 comprises a three channel 511 RGB signal configured in accordance with a desired second color gamut (typically the color gamut of the intended display device). Analogous to the previous process, this decreased resolution color signal is quickly generated using a look up table forming part of the color de-resolution circuitry 509. The table quickly down converts the signal to a lower resolution color encoding. The output signal 510 is output from the apparatus 501 for further processing.

It is an important feature of this embodiment that the high resolution channels and the processing associated with them are confined to just the three blocks 507, 508, 509 without other blocks or operations performed in between. This is because the cost of the circuitry required to process such high resolution signals is quite high. The inventors can lower the cost of display devices featuring gamut mapping by confining the expensive high resolution signal processing circuitry to just the gamut mapping portion of the circuitry. In this way, less expensive lower resolution circuitry can be used to conduct other signal processing (including the ancillary signal processing discussed above). Thus, the expensive components and processing is confined to the gamut mapping processes described herein (e.g., with respect to FIG. 5). In such an implementation, all ancillary processing can be done at lower resolution prior to input into the circuitry 501. Alternatively, all ancillary processing can be done at lower resolution after the gamut mapped data is output from the circuitry 501. Thus, the inventors contemplate that the circuitry 501 can be incorporated into a larger system or integrated into a system on a chip configuration or form a circuit board configuration. Such circuitry can have wide utility in display devices as well as any device having a display media associated with it.

Figure 6:
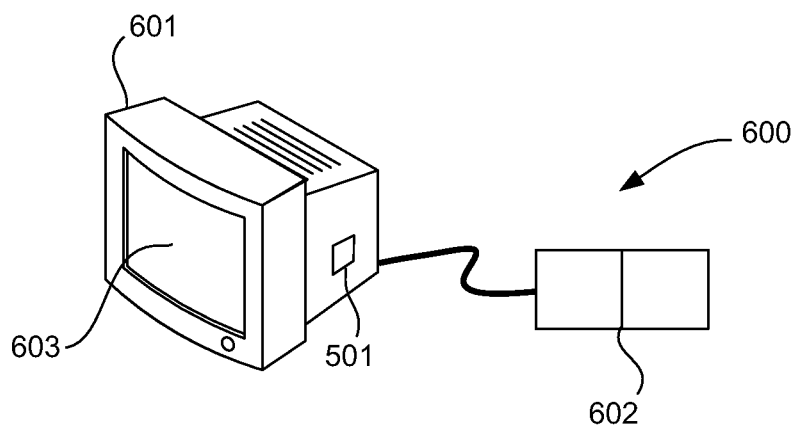
FIG. 6 is a higher level depiction of a system embodiment employing selected method and device embodiments of the invention.

FIG. 6 is a simplified illustration of one example mode of employment for an embodiment of the invention. Such a system 600 can include a display device 601 coupled with a source device 602. Such coupling can be achieved using a number of methods and devices known to a person of ordinary skill in the art. For example, a wired connector or a wireless connector can be used to couple the systems 601, 602.

The system is typically arranged such that the display 601 includes a gamut mapping circuit 501 and a display media 603 arranged for presentation of visual images. Typical examples of such media include CRT's, plasma devices, penetron devices, LCD devices, LED devices, as well as many others known in the art and integrated into display devices. Sources 602 may include, but are not limited to any suitable video, audio, and/or data source device including a desktop computers, portable computers, DVD players, Blu-ray players, set-top boxes or video graphics cards, among a myriad of other multi-media content transmitting devices. Additionally, the described embodiments are particularly well-suited for use with high-definition (HD) content.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An integrated circuit system comprising:
    an input comprising a receiver configured to receive an input video signal encoded in a first format characterized by a first color resolution;
    a mapping system comprising:
        color resolution enhancement circuitry configured to convert the input video signal from the first format having the first color resolution into a first higher resolution video signal defined by an expanded bit range and enhanced color resolution;
        color mapping circuitry configured to map the first higher resolution video signal from the first color gamut to said second color gamut thereby generating a second higher resolution video signal that defines an expanded resolution mapped video signal in accordance with the second gamut; and
        color deresolution circuitry for converting the expanded resolution mapped video signal into an output video signal encoded in a desired display format having an output resolution that is lower than the expanded resolution mapped video signal;
    an output system configured to receive the output video signal from the mapping system and outputting an output video signal; and
    a scaling-engine that processes video data in the system such that an input video is scaled to produce an output video having a desired scale, wherein the scaling-engine is arranged between the receiver that receives the input signal and the color resolution enhancement circuitry, thereby enabling the scaling engine to operate on the lower resolution input video signal encoded in the first format at the first color resolution.

2. The integrated circuit system of claim 1 wherein:
    the first color gamut is associated with a source providing the input video signal; and
    the second color gamut is associated with an intended display medium that receives the output video signal.

3. The integrated circuit system of claim 1 wherein the scaling-engine is arranged between the color deresolution circuitry and the output system for outputting the output signal.

4. The integrated circuit system of claim 1 wherein the system further includes deinterlacing circuitry for converting interlaced input video to a non-interlaced output video.

5. The integrated circuit system of claim 4 wherein the deinterlacing circuitry is arranged between the receiver that receives the input signal and the color resolution enhancement circuitry thereby enabling the deinterlacing circuitry to operate on the lower resolution input video signal encoded in the first format at the first color resolution.

6. The integrated circuit system of claim 4 wherein the deinterlacing circuitry is arranged between the color deresolution circuitry and the output system for outputting the output video signal.

7. The integrated circuit system of claim 1 wherein:
    the system is configured so that color mapping circuitry receives the expanded resolution video signal from the color resolution enhancement circuitry without intervening processing circuitry; and the color deresolution circuitry receives the expanded resolution mapped video signal from the color mapping circuitry without intervening processing circuitry.

8. The integrated circuit system of claim 1 wherein:

the input comprises a receiver configured to receive said input video signal, wherein said input video signal is encoded in a first format comprising an eight bit per channel color resolution;

the color resolution enhancement circuitry is configured to convert the input video signal into the first higher resolution signal defined by an eighteen bit per channel color resolution;

the color mapping circuitry is configured to map the eighteen bit per channel signal from the first color gamut to the second gamut, also defined by eighteen bit per channel resolution, thereby generating an eighteen bit per channel expanded resolution mapped video signal; and the color deresolution circuitry is configured to receive the eighteen bit per channel expanded resolution mapped video signal and is configured to convert the eighteen bit per channel mapped video signal into a lower resolution output signal having a resolution of eight bits per channel.

9. The integrated circuit system of claim 1 wherein:

the input comprises a receiver configured to receive said input video signal wherein said input video signal is encoded in a first format comprising an eight bit per channel color resolution;

the color resolution enhancement circuitry is configured to convert the input video signal into the first higher resolution signal defined by an eighteen bit per channel color resolution;

the color resolution enhancement circuitry further comprises dithering circuitry configured to reduce the bit depth of the eighteen bit per channel color resolution to a sixteen bit per channel color resolution defining a pseudo-eighteen bit per channel color resolution;

the color mapping circuitry is configured to map the sixteen bit per channel signal from the first color gamut to the second gamut also defined by sixteen bit per channel resolution, thereby generating a sixteen bit per channel pseudo-eighteen bit expanded resolution mapped video signal; and the color deresolution circuitry is configured to receive the sixteen bit per channel pseudo-eighteen bit expanded resolution mapped video signal and to convert the pseudo-eighteen bit per channel mapped video signal into a lower resolution output signal having a resolution of eight bits per channel.

10. The integrated circuit system of claim 1 wherein:

the color resolution enhancement circuitry configured to convert the input video signal into a first higher resolution video signal comprises a first look up table that maps a low resolution color channel of the input video signal into an associated higher resolution color channel defined by an expanded bit range and enhanced color resolution;

the color mapping circuitry comprises a matrix associated with a set of transfer functions suitable for mapping each high resolution color channel from said first color gamut into a resultant high resolution color channel associated with said second color gamut, each resultant high resolution color channel being incorporated into a second higher resolution video signal, thereby generating the expanded resolution mapped video signal; and the color deresolution circuitry comprises a second look up table that maps the resultant high resolution color channel into an associated lower resolution color channel defined by a reduced bit size encoded in a format displayable by a desired display medium.

11. The integrated circuit system of claim 1 wherein the system is coupled to a display device further including a display media, wherein:

the input receiver is arranged to receive the input video signal from a video source; and the output video signal is input into the display media for display.

12. A method for color mapping of video information, the method comprising:

1. receiving an input video signal encoded in a first format characterized by a first color resolution;
2. converting the input video signal from the first format into a higher resolution video signal defined by an expanded bit range and enhanced color resolution;
3. color mapping said higher resolution video signal from a first color gamut associated with the input video signal to a second color gamut associated with a desired output, thereby generating another higher resolution video signal that defines a higher resolution mapped video signal in accordance with the second gamut;
4. converting the higher resolution mapped video signal into an output video signal encoded in a desired display format having a lower resolution than the mapped video signal, wherein operations 2, 3 and 4 are performed sequentially without intervening operations; and scaling the input video signal such that the output video signal has a desired resolution associated with the display media, where the scaling occurs prior to converting the input video signal into the higher resolution video signal; or after converting of the mapped video signal into the lower resolution output video signal.

13. The method of claim 12 further including an operation of outputting the output video signal to a display media.

14. The method of claim 13 wherein color mapping includes mapping from the first color gamut, wherein said first gamut is associated with a source providing the input video signal to said second color gamut wherein the second color gamut is associated with said display media.

15. The method of claim 12 further including receiving the input video signal from a multi-media source device and wherein the method further comprises an operation of outputting the output video signal to a display media.

16. The method of claim 12 wherein the method further includes deinterlacing the input video signal to generate a non-interlaced output signal.

17. The method of claim 16 wherein said deinterlacing occurs:

prior to converting the input video signal into the higher resolution video signal; and after converting of the mapped video signal into the lower resolution output video signal.

18. The method of claim 12 wherein said, receiving the input video signal includes receiving a signal encoded in a first format of eight bit per channel color resolution;

converting the input video signal comprises converting the eight bit per channel signal into an eighteen bit per channel color resolution signal;

color mapping the eighteen bit per channel signal from the first color gamut to the second gamut, also of eighteen bit per channel resolution, to generate an eighteen bit per channel expanded resolution mapped video signal; and converting the eighteen bit per channel expanded resolution mapped video signal into a lower resolution output signal having a resolution of eight bits per channel.

19. The method of claim 12 wherein, converting the input video signal from the first format to the first higher resolution video signal comprises using a first look up table that converts each color channel of the input video signal into the associated first higher resolution color channel; and converting the expanded resolution mapped video signal into the lower resolution output video signal by using a second look up table that converts each channel of the mapped video signal into associated lower resolution color channels.

20. A non-transitory computer-readable medium for mapping color channels, the non-transitory computer-readable medium having computer-readable instructions comprising:
1. computer-readable instructions for receiving an input video signal encoded in a first format characterized by a first color resolution;
2. computer-readable instructions for converting the input video signal from the first format having the first color resolution into a first higher resolution video signal defined by an expanded bit range and enhanced color resolution;
3. computer-readable instructions for color mapping said first higher resolution video signal from a first color gamut associated with the input video signal to a second color gamut associated with a desired output, thereby generating a second higher resolution video signal that defines an expanded resolution mapped video signal in accordance with the second gamut;
4. computer-readable instructions for converting the expanded resolution mapped video signal into an output video signal encoded in a desired display format having a lower resolution than the expanded resolution mapped video signal, wherein the operations performed by computer-readable instructions 2, 3 and 4 are performed sequentially without intervening operations; and computer-readable instructions for scaling the input video signal such that the output video signal has a desired resolution associated with the display media, where the scaling occurs prior to converting the input video signal into the higher resolution video signal; or after converting of the mapped video signal into the lower resolution output video signal.

21. The non-transitory computer-readable medium recited in claim 20 wherein:

the computer-readable instructions for converting the input video signal from the first format to the first higher resolution video signal comprise computer readable instructions for using a first look up table to convert each color channel of the input video signal into said first higher resolution color channels; and the computer-readable instructions for converting the expanded resolution mapped video signal into the lower resolution output video signal comprises computer readable instructions for using a second look up table to convert each channel of the mapped video signal into an associated lower resolution color channel.

22. An integrated circuit chip, the chip configured to map color channels between devices, the chip configured to execute computer code instructions for performing the operations of:
1. receiving an input video signal encoded in a first format characterized by a first color resolution;
2. converting the input video signal from the first format having the first color resolution into a first higher resolution video signal defined by an expanded bit range and enhanced color resolution;
3. color mapping said first higher resolution video signal from a first color gamut associated with the input video signal to a second color gamut associated with a desired output, thereby generating a second higher resolution video signal that defines an expanded resolution mapped video signal in accordance with the second gamut;
4. converting the expanded resolution mapped video signal into an output video signal encoded in a desired display format having a lower resolution than the expanded resolution mapped video signal, wherein operations 2, 3 and 4 are performed sequentially without intervening operations; and scaling the input video signal such that the output video signal has a desired resolution associated with the display media, where the scaling occurs prior to converting the input video signal into the higher resolution video signal; or after converting of the mapped video signal into the lower resolution output video signal.

23. The chip of claim 22, wherein at least part of the code comprises firmware embedded in circuitry of the chip.

\* \* \* \* \*